(12) United States Patent
Skubic et al.

(10) Patent No.: US 10,530,518 B2
(45) Date of Patent: Jan. 7, 2020

(54) NETWORK ARCHITECTURE, AN OPTICAL COMMUNICATION NETWORK AND USE OF AN MD-WSS

(71) Applicant: Telefonaktiebolaget LM Ericsson (publ), Stockholm (SE)

(72) Inventors: Björn Skubic, Sollentuna (SE); Ahmad Rostami, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/760,626

(22) PCT Filed: Sep. 30, 2015

(86) PCT No.: PCT/SE2015/051034
§ 371 (c)(1),
(2) Date: Mar. 15, 2018

(87) PCT Pub. No.: WO2017/058070
PCT Pub. Date: Jul. 6, 2017

(65) Prior Publication Data
US 2018/0254847 A1    Sep. 6, 2018

(51) Int. Cl.
*H04J 14/02* (2006.01)
*H04Q 11/00* (2006.01)

(52) U.S. Cl.
CPC ...... *H04J 14/0267* (2013.01); *H04J 14/0212* (2013.01); *H04Q 11/0005* (2013.01);
(Continued)

(58) Field of Classification Search
CPC ............ H04J 14/0267; H04J 14/0212; H04Q 11/0062; H04Q 11/0005; H04Q 2011/0069; H04Q 2011/005
See application file for complete search history.

(56) References Cited

U.S. PATENT DOCUMENTS

2013/0114957 A1* 5/2013 Homa ............... H04J 14/0212
398/48
2014/0105600 A1    4/2014 Dahlfort et al.
(Continued)

FOREIGN PATENT DOCUMENTS

| CN | 102098098 A | 6/2011 |
| CN | 102226848 A | 10/2011 |

(Continued)

OTHER PUBLICATIONS

International Search Report and Written Opinion for International Application No. PCT/SE2015/051034, dated Jun. 13, 2016, 13 pages.
(Continued)

*Primary Examiner* — Leslie C Pascal
(74) *Attorney, Agent, or Firm* — NDWE LLP (57) ABSTRACT

A network architecture for an optical communication network, an optical communication network configured according to the network architecture and a method for interconnecting via a MD-WSS are provided. The network comprises at least a first ODN, an MD-WSS having a plurality of ports, and at least a first node. The first ODN is connected to one of the ports of the MD-WSS and the first node is connected to another one of the ports of the MD-WSS, wherein the ports of the MD-WSS 100 are paired such that the port connected to the first ODN is paired with the port connected to the first node such that signals originating from the first ODN are in a default case routed to the first node, and signals originating from the first node are in the default case routed to the first ODN.

9 Claims, 10 Drawing Sheets

(52) U.S. Cl.
CPC ... *H04Q 11/0062* (2013.01); *H04Q 2011/005* (2013.01); *H04Q 2011/0069* (2013.01)

(56) References Cited

U.S. PATENT DOCUMENTS

2015/0155964 A1\* 6/2015 Han ............... H04J 14/0213
398/50
2016/0315697 A1\* 10/2016 Breukelaar ......... H04J 14/0212

FOREIGN PATENT DOCUMENTS

| CN | 102790653 A | 11/2012 | | |
|---|---|---|---|---|
| EP | 2651059 A1 | \* | 10/2013 | .......... H04J 14/0204 |
| EP | 2963851 A1 | \* | 1/2016 | .......... H04J 14/0206 |

OTHER PUBLICATIONS

Ahmad Rostami et al., "Multidirectional Routing in Wavelength Selective Switches," Mar. 22-26, 2015, 3 pages, 2015 Optical Fiber Communications Conference and Exhibition (OFC).
Ahmad Rostami et al., "First Experimental Demonstration of Orchestration of Optical Transport, RAN and Cloud based on SDN," Mar. 22-26, 2015, 3 pages, 2015 Optical Fiber Communications Conference and Exhibition (OFC).
International Preliminary Report on Patentability for Application No. PCT/SE2015/051034 dated Apr. 12, 2018, 9 pages.
First Office Action from foreign counterpart Chinese Patent Application No. 201580083471.6, dated Jul. 5, 2019, 12 pages.
Search Report from foreign counterpart Chinese Patent Application No. 201580083471.6 dated Jun. 26, 2019, 2 pages.

\* cited by examiner

Ideal MD-WSS

NETWORK ARCHITECTURE, AN OPTICAL COMMUNICATION NETWORK AND USE OF AN MD-WSS

CROSS-REFERENCE TO RELATED APPLICATIONS

This application is a National stage of International Application No. PCT/SE2015/051034, filed Sep. 30, 2015, which is hereby incorporated by reference.

TECHNICAL FIELD

The present disclosure relates to wireless communication and in particular to optical communication and a network architecture, as well as an optical communication network configured according to the network architecture and use of a Multi Directional Wavelength Selective Switch, MD-WSS.

BACKGROUND

With deployment of small cells, an important challenge is to provide connectivity to the small cell sites. Several operators are considering the fixed access infrastructure with its deep penetration as an important avenue for providing connectivity to the small cell sites. Current fixed access networks are largely based on copper (xDSL, Digital Subscriber Line), but fibre is becoming increasingly common through deployment of fibre-to-the-home/building/curve (FTTH/FTTB/FTTC). This opens up the interest for use of optical technologies for providing small cell connectivity.

There are several scenarios for how the fixed access infrastructure could be exploited for small cell transport in mobile networks. One scenario is based on network sharing on layers 2 and 3, L2/L3. Small cells could for example be backhauled through L2/L3 packet aggregation reusing fixed access systems and where multi-service/multi-operator sharing of the network is implemented on L2/L3. Another possibility is the implementation of multi-service/multi-operator infrastructure sharing on lower layers. This could for example be achieved on the wavelength level. This means that there would be dedicated systems for small cell transport reusing the fixed access infrastructure via e.g. a wavelength overlay. An example of where this could be required is for the case of centralised deployment of small cells based on fronthaul where stringent latency/jitter requirements prohibit the use of traditional fixed access systems (such as Time Division Multiplex-Passive Optical Network, TDM-PON) for fronthaul. Hence, small cell densification is one factor that could drive an increased need for multi-operator/multi-service sharing of the access infrastructure. Also, in a the context of the Networked Society it will become increasingly important for a fibre infrastructure provider to be able to provide wavelength services to new types of actors (e.g. verticals).

Thus, it is anticipated that it will become increasingly important to be able to flexibly provision and optimise usage of the fixed access infrastructure resources. In today's optical access systems, use of Wavelength Division Multiplexing, WDM, is limited due to the cost of the interfaces. However, ongoing efforts in realising low cost tunable lasers to enable colourless transceivers and with the introduction of WDM technology in the next-generation optical access systems (through Time Wavelength Division Multiplexing-PON, TWDM-PON), WDM is expected to become increasingly important for the access. To further introduce wavelength switching requires devices such as Wavelength Selective Switches, WSSs and Reconfigurable Optical Add Drop Multiplexers, ROADMs, which currently are costly for the access segment. However, a recently proposed Multi Directional WSS, MD-WSS, which enables more efficient use of the wavelength routing capabilities of the WSS could be used to reduce the barrier for wavelength switching in the access. In a longer time horizon, integrated photonics promises low cost devices for wavelength switching that could be applicable for the access segment.

Current access networks are inflexible in terms of multi-service/multi-operator support. Certain deployment models (combined fixed access and fronthaul over the same fibre infrastructure) are either not supported or require large effort in terms of network planning and service provisioning (e.g. installing fixed co-existence filters). Current optical access networks provide limited flexibility for optimising network resource utilisation (e.g. enabling optical Line Terminal, OLT, sleep modes). Also, migration and upgrade often results in service disruption and require careful planning (due to limited possibilities for re-routing access traffic during service windows).

SUMMARY

The object is to obviate at least some of the problems outlined above. In particular, it is an object to provide a network architecture for an optical communication network, an optical communication network and a use of an MD-WSS. These objects and others may be obtained by providing a network architecture, an optical communication network and a use of an MD-WSS according to the independent claims attached below.

According to an aspect a network architecture for an optical communication network is provided. The network comprises at least a first Optical Distribution Network, ODN, a Multi Directional Wavelength Selective Switch, MD-WSS, having a plurality of ports, and at least a first node. The first ODN is connected to one of the ports of the MD-WSS and the first node is connected to another one of the ports of the MD-WSS, wherein the ports of the MD-WSS are paired such that the port connected to the first ODN is paired with the port connected to the first node such that signals originating from the first ODN are in a default case routed to the first node, and signals originating from the first node are in the default case routed to the first ODN.

According to an aspect an optical communication network configured according to the architecture is provided. The optical communication network comprises at least a first ODN, a MD-WSS having a plurality of ports, and at least a first node, wherein the first ODN is connected to one of the ports of the MD-WSS and the first node is connected to another one of the ports of the MD-WSS, wherein the ports of the MD-WSS are paired such that the port connected to the first ODN is paired with the port connected to the first node such that signals originating at the first ODN are in the normal case routed to the first node, and signals originating at the first node are in the normal case routed to the first ODN.

According to an aspect, use of an MD-WSS having a plurality of ports in a network is provided. The MD-WSS is used for interconnecting at least a first node and a first ODN by connecting at least the first node to one port, and the at least first ODN to another port, wherein the ports of the MD-WSS are paired such that the port connected to the first ODN is paired with the port connected to the first node such that signals originating at the first ODN are in a default case routed to the first node, and signals originating at the first node are in the normal case routed to the first ODN.

The network architecture for an optical communication network, an optical communication network configured according to the network architecture and use of an MD-WSS all have the same possible advantages. One possible advantage is that flexible multi-operator sharing on wavelength level may be obtained since the architecture introduces low cost wavelength flexibility in the access infrastructure allowing for multi-actor sharing of the fibre infrastructure. Another possible advantage is that flexible multi-service support on wavelength level may be obtained since the architecture enables flexible multi-service (e.g. packet and Common Public Radio Interface, CPRI) support over the same fibre infrastructure. Still another possible advantage is that flexible resource/energy optimisation may be obtained since the flexibility introduced by the architecture enables increased opportunities for resource optimisation depending on traffic load by re-routing traffic and e.g. powering off ports/cards that are not used for saving energy. Yet another possible advantage is that migration and/or upgrade may be simplified since the flexibility introduced by the architecture facilitates migration/upgrade where critical services may temporarily be re-routed to alternative ports during migration/upgrade process. A further possible advantage is that resiliency may be increased since the flexibility introduced by the architecture provides improved resiliency where critical services may temporarily be re-routed to alternative ports during a node failure.

BRIEF DESCRIPTION OF DRAWINGS

Embodiments will now be described in more detail in relation to the accompanying drawings, in which:

FIG. 2b is an illustration of a wavelength routing configuration of the MS-WSS of FIG. 2a.

DETAILED DESCRIPTION

Briefly described, a network architecture for an optical communication network, an optical communication network configured according to the network architecture and use of an MD-WSS are provided. The MD-WSS is inserted in a one or more feeder fibres, or feeder fibre section(s), between one or more node(s) and one or more ODN(s), wherein ports of the MD-WSS are paired in order to create a default routing and a non-default routing. In the default routing, signals originating from a first ODN are routed to a first node, and signals originating from the first node are routed to the first ODN.

Embodiments herein relates to a network architecture for an optical communication network. The network comprises at least a first Optical Distribution Network, ODN, a Multi Directional Wavelength Selective Switch, MD-WSS, having a plurality of ports, and at least a first node. Embodiments of such a network architecture will now be described with reference to FIGS. 1a-1h.

Figure 1A:
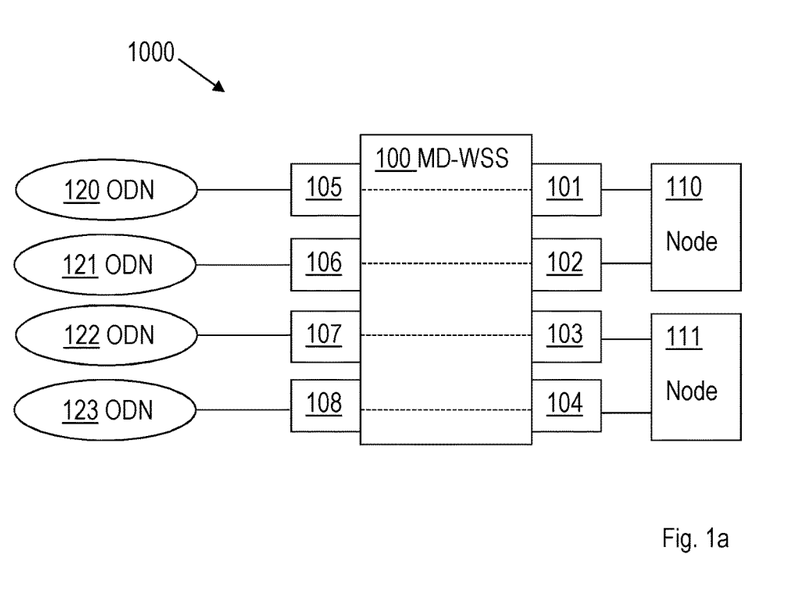
FIG. 1a is an illustration of a network architecture according to an exemplifying embodiment.

FIG. 1a illustrates that the first ODN 120 is connected to one of the ports 105 of the MD-WSS 100 and the first node 110 is connected to another one of the ports 101 of the MD-WSS 100, wherein the ports 101, 105 of the MD-WSS 100 are paired such that the port 105 connected to the first ODN 120 is paired with the port 101 connected to the first node 110 such that signals originating from the first ODN 120 are in a default case routed to the first node 110, and signals originating from the first node 110 are in the default case routed to the first ODN 120.

In FIG. 1a, the network architecture is also illustrated as comprising three additional ODNs 121-123 and one additional node 111 (second node). Further, the MD-WSS 100 is illustrated having eight ports 101-108. It shall be pointed out that all figures in this disclosure are meant as illustrative examples or embodiments. Consequently, the network architecture is not limited to the number of ODNs, nodes, ports etc. that are illustrated in the figures. In FIGS. 1a-1n, MD-WSS always has reference number 100, 100a, 100b. It shall be pointed out that this is not intended to illustrate that it is necessarily "the same" MD-WSS in all those figures, but instead different illustrating examples of an MD-WSS that may be comprised in the network architecture.

Some, or all of the, ports of the MD-WSS may be paired such that a default routing is obtained. As stated above, port 101 is paired with port 105 wherein incoming signals on port 101 is by default routed to port 105 and vice versa.

The different functions of the MD-WSS 100 will be explained in more detail with reference to FIGS. 2a-2d below. Shortly, the MD-WSS generally comprises a common port and at least two tributary ports. In a conventional WSS, signals received on the common port are outputted on one of the tributary ports and signals received on any of the tributary ports are outputted on the common port. Depending on wavelength grid, i.e. 100 GHz (96 wavelengths) or 50 GHz (180 wavelengths) the number of WSSs (N) per routed wavelength is N/96 or N/180. For a MD-WSS however, signals received on any port (common or tributary) may be outputted on any port (common or tributary). For the MD-WSS, the number of WSSs per routed wavelength depends on the routing configuration. Since the MD-WSS is capable of simultaneously routing a single wavelength between multiple port pairs, the cost per routed wavelength may be reduced compared to the conventional approach. For the "port-pair configuration" the number of WSSs per routed wavelength for a 10-port WSS is N/96/5 or N/180/5. The number of WSSs per routed wavelength scales inversely with number of port pairs in the MD-WSS. Hence, for a 24-port MD-WSS the number of WSSs per WL is N/96/12 or N/180/12, hence an order of magnitude lower than for the conventional use of a WSS.

In FIGS. 1a, 1b, 1d-1h, the MD-WSS 100 is inserted in a respective feeder fibre section between the node(s) and the ODN(s). Thus, looking for example at FIG. 1a, removing the MD-WSS 100, there would be one feeder fibre section between the first node 110 and the first ODN 120, one feeder fibre section between the first node 110 and the second ODN 121 etc. Again, it is pointed out that FIG. 1a is merely an illustrative example, wherein ODNs 121-123 and the second node 111 are optional.

The network architecture comprises one or several ODNs 120-123 which each could be serving one or several systems (e.g. access, backhaul, fronthaul systems). The MD-WSS 100 can be said to be inserted in the feeder fibre section in such a manner that for each feeder fibre section the downlink part is connected to one port 105 of the MD-WSS 100 and the uplink part is connected to the corresponding port-pair 101 of the MD-WSS 100. In this manner when the MD-WSS is in its port-pair routing configuration for a particular wavelength, the MD-WSS provides connectivity between the uplink and downlink parts of each feeder fibre in the feeder section(s) for the particular wavelength.

Due to the default routing, traffic between different nodes and respective ODNs is generally routed going through the MD-WSS according to the pairing of ports. However, should for example a node malfunction or any other event occur that may disturb the traffic, a non-default routing may be employed such that traffic is not routed according to the pairing of ports. This will be explained in more detail below.

The network architecture has several possible advantages. One possible advantage is that flexible multi-operator sharing on wavelength level may be obtained since the architecture introduces low cost wavelength flexibility in the access infrastructure allowing for multi-actor sharing of the fibre infrastructure. Another possible advantage is that flexible multi-service support on wavelength level may be obtained since the architecture enables flexible multi-service (e.g. packet and Common Public Radio Interface, CPRI) support over the same fibre infrastructure. Still another possible advantage is that flexible resource/energy optimisation may be obtained since the flexibility introduced by the architecture enables increased opportunities for resource optimisation depending on traffic load by re-routing traffic and e.g. powering off ports/cards that are not used for saving energy. Yet another possible advantage is that migration and/or upgrade may be simplified since the flexibility introduced by the architecture facilitates migration/upgrade where critical services may temporarily be re-routed to alternative ports during migration/upgrade process. A further possible advantage is that the resiliency may be increased since the flexibility introduced by the architecture provides improved resiliency where critical services may temporarily be re-routed to alternative ports during a node failure.

In an embodiment, the network architecture further comprises a second ODN 121 connected to a port 106 of the MD-WSS 100, which port is paired to another port 102 of the MD-WSS that is either (i) also connected to the first node 110 or that is (ii) connected to a second node 111.

looking at FIG. 1a, assume ODN 122 and ODN 123 is not present, but only ODN 120, ODN 121, the first node 110, the second node 111, the MD-WSS 100 having at least port 101, 102, 105, and 106. Assuming port 102 is connected to the second node 111, in case the first node 110 should malfunction, traffic to and/or from the first ODN 120 may instead be routed via the second node 111 and hence they will not be "cut off" from communication.

In another embodiment, the MD-WSS 100 further comprises two ports 109 and 1010 that are connected to a ring comprising a part of the optical communication network.

Figure 1B:
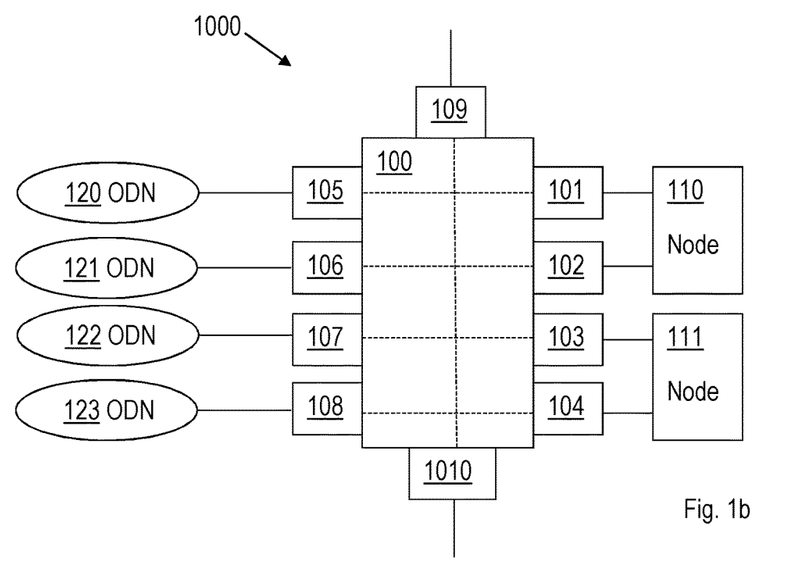
FIG. 1b is an illustration of a network architecture according to yet an exemplifying embodiment.
Figure 1C:
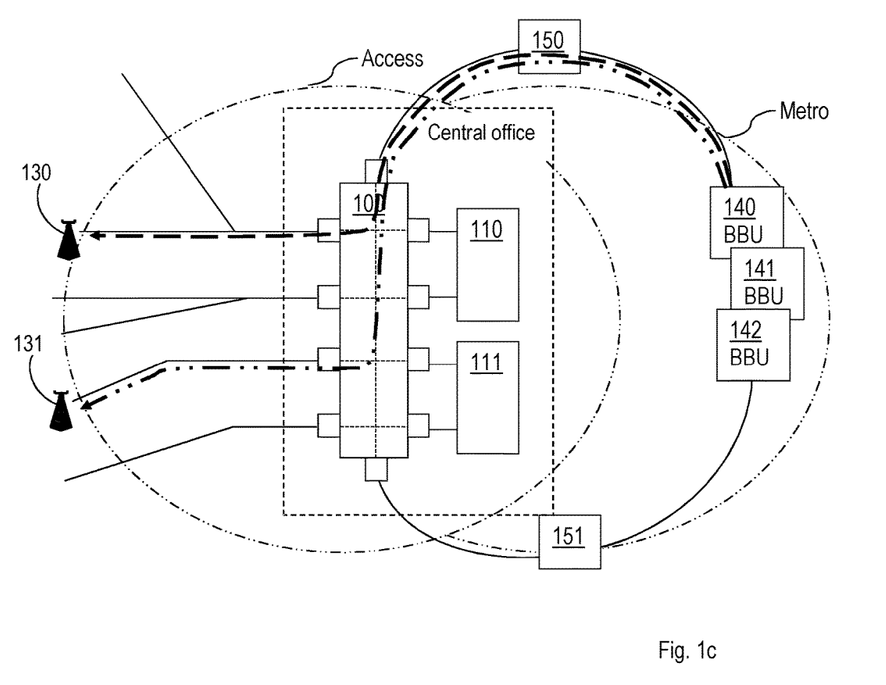
FIG. 1c is an illustration of a network architecture and a use case enabling flexible reuse of fixed access FTTH infrastructure for mobile fronthaul according to an exemplifying embodiment

FIGS. 1b and 1c illustrate an example of such an embodiment. In the exemplifying example of FIG. 1c, the ring comprises the MD-WSS 100, an MD-WSS 150 (which is merely an example), three Base Band Units, BBUs 140-142 (which also are merely examples of components/devices/units that that may be comprised in the ring) and yet another MD-WSS 151 (which also is merely an example).

The two ports 109 and 1010 may also be paired such that incoming traffic on 109 and 1010 by default is routed to the other, 1010 and 109. However, as illustrated in FIG. 1c, The MD-WSS 100 may additionally also route traffic in a manner such that traffic may flow between e.g. Remote Radio Units, RRUs 130, 131 and the BBUs 140-142. The two ports 109 and 1010 can be said to enable "external" connectivity to other network(s), e.g. the metro communication network in FIG. 1c.

For wavelength routing between two "non-pair" ports (see e.g. FIG. 1c) the number of WSSs per routed wavelength is the same as for the conventional use of the WSS. Hence, to save cost the architecture should be such that most wavelengths for most of the time are routed according to the "port-pair configuration". The flexibility to route individual wavelength between non-pair ports is there and may be exploited for any wavelength, but it is assumed that at a given point in time only a few wavelengths would be routed between two "non-pair" ports. This is the reason/condition for the architecture to lead to large cost savings compared to conventional use of wavelength switching devices.

According to yet an embodiment, the part of the optical network comprised in the ring comprises at least one of another MD-WSS 150-151, a BBU 140-142, an RRH 130-131, a WSS, an optical gateway and an optical to electrical converter. Other non-limiting examples of components, devices, elements or arrangements that may be comprised in the ring are OADMs, ROADMs and Optical Cross Connectors, OXCs.

There are many different examples of components, devices, units and/or arrangements that could be comprised in the ring. The use of e.g. one or more MD-WSSs in the ring enables interconnection between further parts of the optical communication network.

By means of the MD-WSS 100, the one or more ODNs 120-123 and the one or more nodes 110, 111 may be interconnected in a variety of constellations providing both resilience and flexibility.

According to still an embodiment, signals originating from the first node may alternatively, in a non-default case, be routed by the MD-WSS to the second ODN, signals originating from the second ODN may alternatively, in the non-default case, be routed by the MD-WSS to the first node.

As described above, the non-default routing comprises routing between ports of the MD-WSS 100 that is not according to the pairing of ports. Several routing examples are provided in FIGS. 1c-1h.

In other words, the MD-WSS can be used to increase flexibility which in turn can be exploited for a wide range of purposes such as multi-service operation, multi-operator scenarios, protection, dynamic resource allocation, dynamic energy management, facilitating migration and upgrades, etc. There are two use cases that will be explained in more detail below, (1) multi-service, multi-operator support, and (2) protection, dynamic resource allocation, dynamic energy management and migration/upgrade support.

Figure 1D:
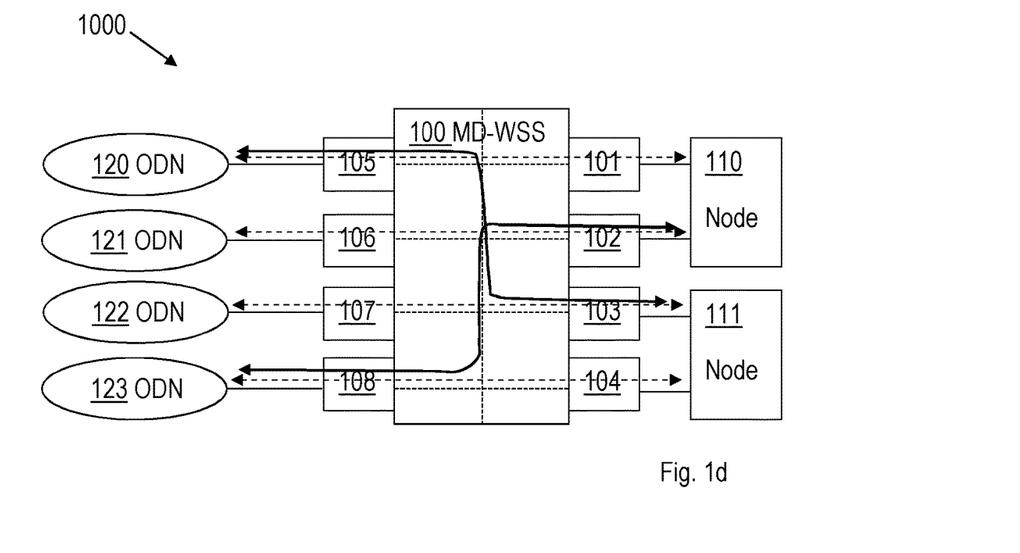
FIG. 1d is an illustration of a network architecture and a use case for connecting clients on different ODNs flexibly to different nodes (different services/operators) according to an exemplifying embodiment.

The first use case may facilitate a wavelength overlay of different services (packet, CPRI, 1G PON, 10G PON, etc.) or operators (fixed, mobile, other or several of the same type) over the same fibre access infrastructure. As illustrated in FIG. 1d, through the MD-WSS 100, wavelengths may be flexibly routed between different client sites at the ODNs and nodes (also referred to as host equipment), which may be dedicated to different services or operators.

Figure 1E:
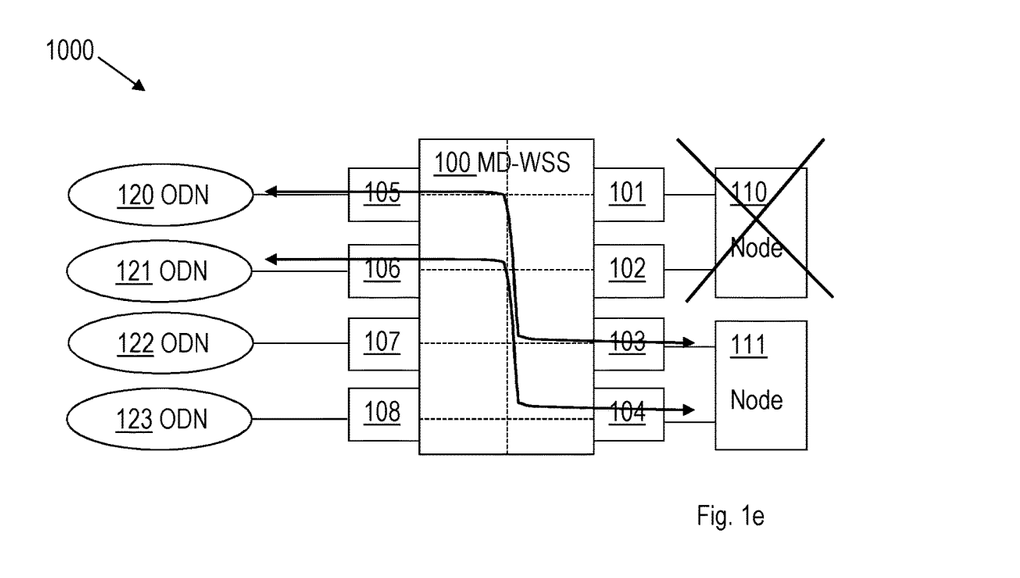
FIG. 1e is an illustration of a network architecture and a use case for flexibly redistributing clients between different nodes for protection, dynamic resource management, dynamic energy management, migration/upgrade according to another exemplifying embodiment.

FIG. 1e illustrates an example of flexible redistribution of clients between different nodes for protection, dynamic resource management, dynamic energy management, migration/upgrade.

According to the second use case, the flexibility enabled by the MD-WSS may also be used to flexibly allocate clients in ODN(s) between different nodes, e.g. host equipment/ resources. This could be used to provide increased resiliency by enabling protection switching. It could be used for dynamic resource allocation where clients with large resource requirements are distributed evenly between host equipment, or for dynamic energy management for powering off host equipment, cards or ports during low load. It could also be used during migration/upgrades for rerouting wavelengths (all or just prioritised) to alternative ports in order to avoid service disruption.

According to a further embodiment, signals originating from one of the first or second ODN and signals originating from the first and the second node may alternatively, in a/the non-default case, be routed by the MD-WSS to one of the ports connected to the ring comprising the part of the optical communication network.

Figure 1F:
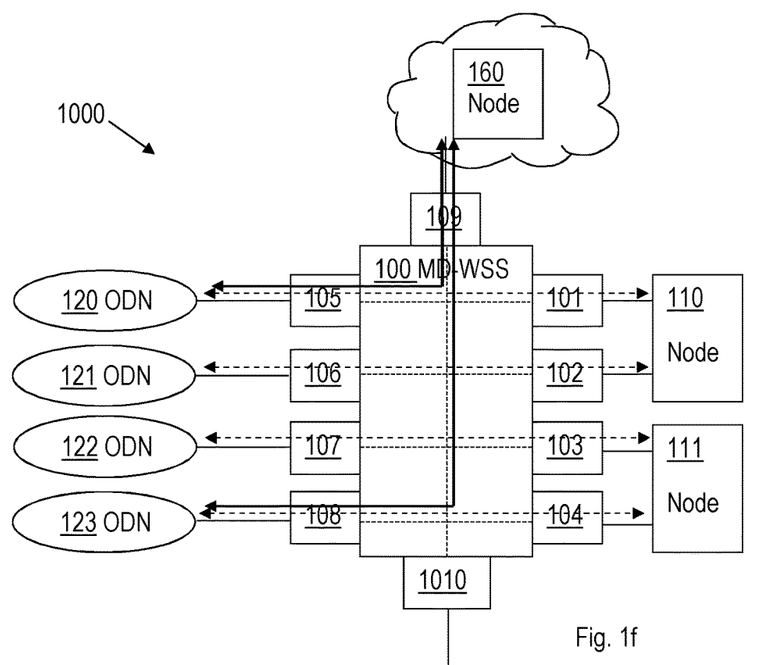
FIG. 1f is an illustration of a network architecture and an extension of the use case in FIG. 1d for connecting clients on different ODNs flexibly to different nodes (different services/operators) according to an exemplifying embodiment.
Figure 1G:
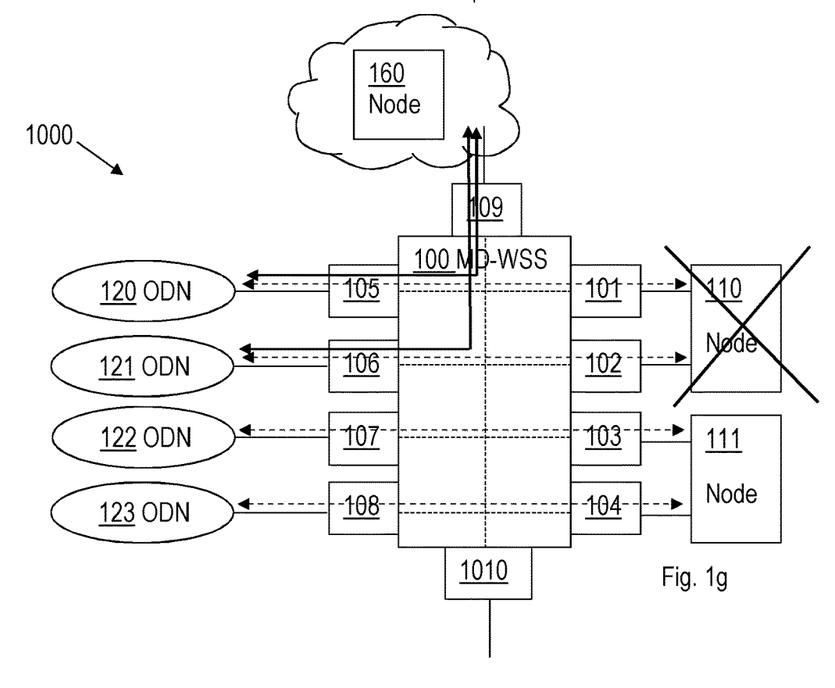
FIG. 1g is an illustration of a network architecture and an extension of the use case in FIG. 1e for flexibly redistributing clients between different nodes for protection, dynamic resource management, dynamic energy management, migration/upgrade according to another exemplifying embodiment.
Figure 1H:
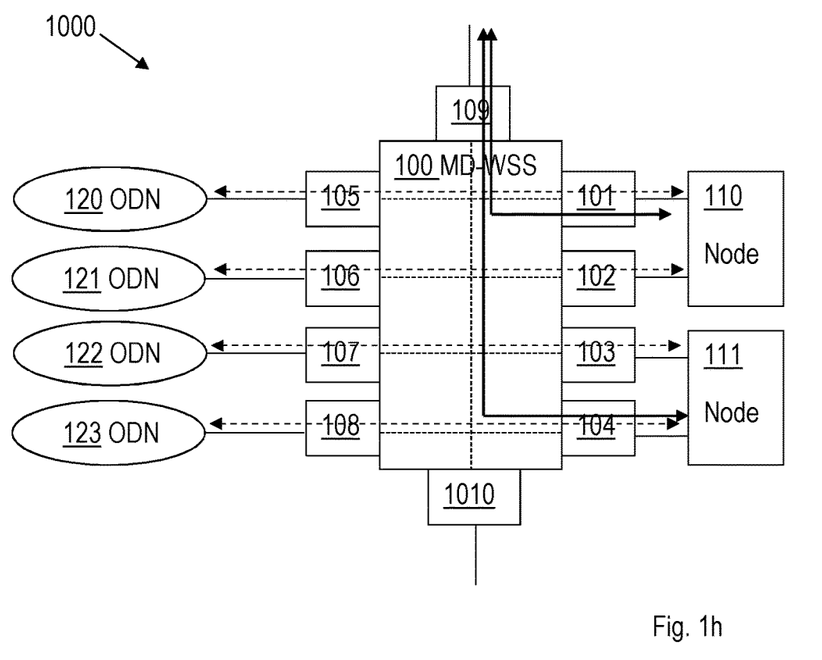
FIG. 1h is an illustration of a network architecture and a use case for exploiting the transparency between access/aggregation for dynamic resource allocation between uplink/downlink for the node resources according to an exemplifying embodiment.
Figure 1I:
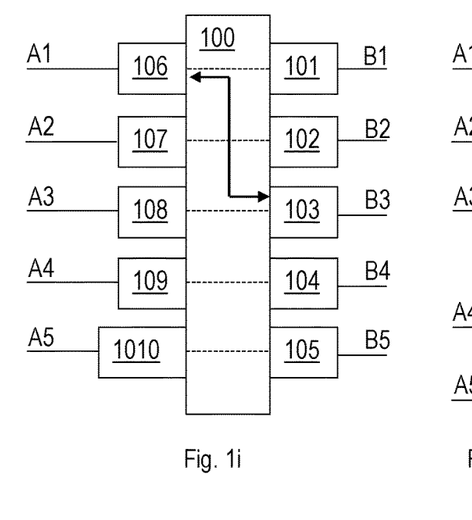
FIGS. 1i and 1j is an illustration of replacing one MD-WSS with two smaller MD-WSSs according to an exemplifying embodiment.

There are different examples illustrated in FIG. 1c, and 1f-1h. FIGS. 1f-1h, illustrate an extension of the considered use cases where node, e.g. host equipment, on external sites also are involved through the additional external ports introduced in the network architecture. This could for example enable deployment of centralised baseband hotels at a few sites with scarcely deployed remote radio units. The external ports provide transparent connectivity between access and aggregation. This may be utilised to provide dedicated wavelength services between access and aggregation as well as a flexible sharing of access and aggregation resources as depicted in FIG. 1b.

FIGS. 1f and 1g illustrate an extension of the use cases illustrated in FIGS. 1d and 1e with external sites and/or resources and where the MD-WSS 100 is exploited for providing flexible connectivity also to nodes at other sites. In FIG. 1f, the node 160 could e.g. be a centralised BBU hotel. FIG. 1h illustrates a use case exploiting the transparency between access and/or aggregation for dynamic resource allocation between uplink and/or downlink for the node resources. In the above mentioned figures, the arrows are double-headed illustrating the routing in both directions.

Figure 1J:
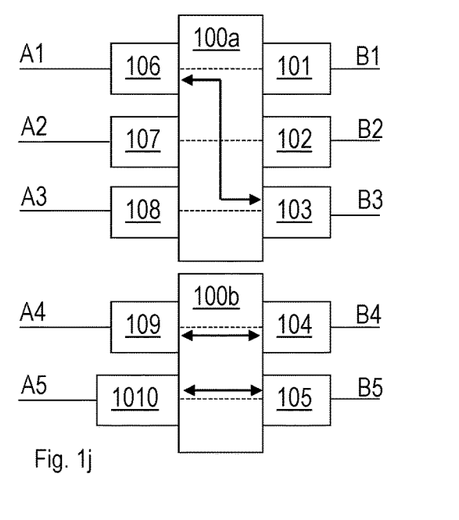

According to yet an embodiment, illustrated in FIG. 1j, the network architecture comprises at least two MD-WSSs 100a, 100b, wherein the MD-WSSs are operating independently of each other such that a first MD-WSS 100a comprises a plurality of ports having connected thereto at least one ODN and at least one node (not shown) and the second MD-WSS 100b comprises a plurality of ports having connected thereto at least one ODN (not shown) and at least one node (not shown).

The network architecture comprises at least a single MD-WSS module 100 in the feeder fibre section. This module may be replaced by blocks consisting of multiple MD-WSSs as illustrated in FIGS. 1i and 1j. For example, in the embodiment illustrated in FIG. 1j, the MD-WSS 100 in FIG. 1i has been replaced by two smaller MD-WSSs 100a and 100b. The motivation for this can be to relieve some of the blocking constrictions associated with routing of wavelengths between individual non-pair ports. By large vs small in this context is meant number of ports of the MD-WSS. FIGS. 1i and 1j together thus shows an example where a single MD-WSS 100 is replaced by two smaller MD-WSSs 100a and 100b. The advantage of this structure may be that individual wavelength routing in any of the MD-WSSs 100a and 100b does not affect routing in the other MD-WSS (blocking constrictions relieved). A possible drawback may be limited flexibility since wavelengths entering ports of one MD-WSS cannot be routed to the second MD-WSS. The number of MD-WSSs is also higher.

According to still an embodiment, the network architecture comprises at least two MD-WSSs, wherein the at least two MD-WSSs are interconnected such that a port of a first MD-WSS is connected to a port of the second MD-WSS.

Figures 1K, 1L:
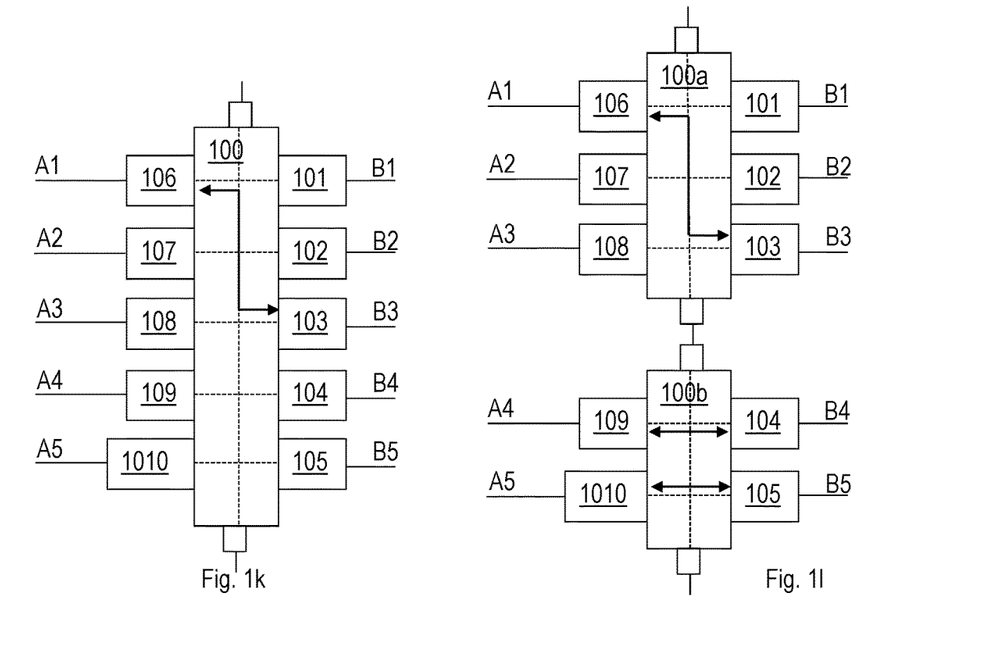
FIGS. 1k and 1l are an illustration of replacing one MD-WSS with two smaller MD-WSSs according to another exemplifying embodiment.

Such an embodiment is illustrated in FIG. 1l. Looking at both FIG. 1k and FIG. 1l, illustrate a single MD-WSS 100 being replaced by two smaller MD-WSSs 100a and 100b. In the configuration illustrated in these figures the MD-WSSs comprises an additional external connection as well as connection between the two MD-WSSs. Compared to the structures in e.g. FIGS. 1d and 1e, this configuration also allows for wavelength routing to external entities. For the configuration with multiple MD-WSSs, wavelength routing between the MD-WSSs is enabled at the cost of additional WSS ports.

Figure 1M:
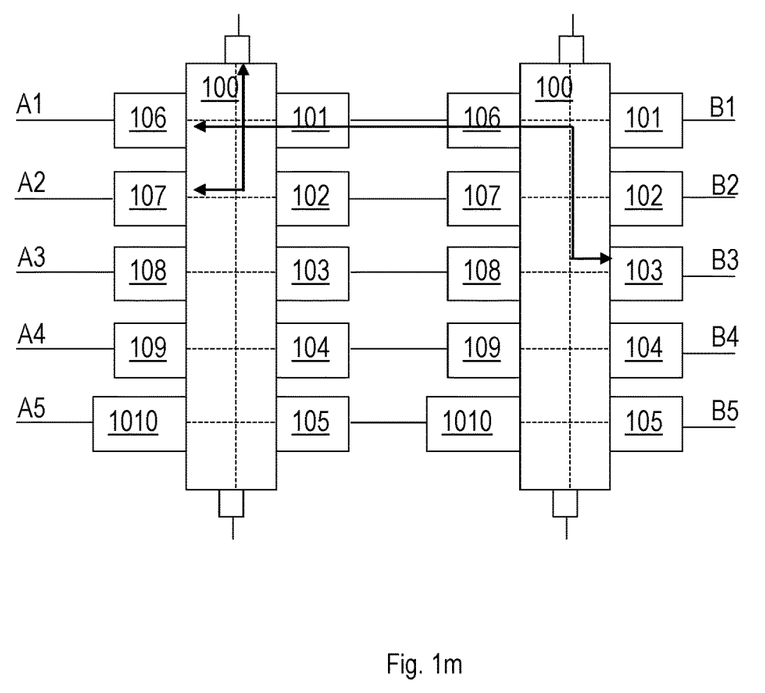
FIGS. 1m and 1n are illustrations of introducing serially connected MD-WSSs to further relieve blocking constrictions for connections to external entities.
Figure 1N:
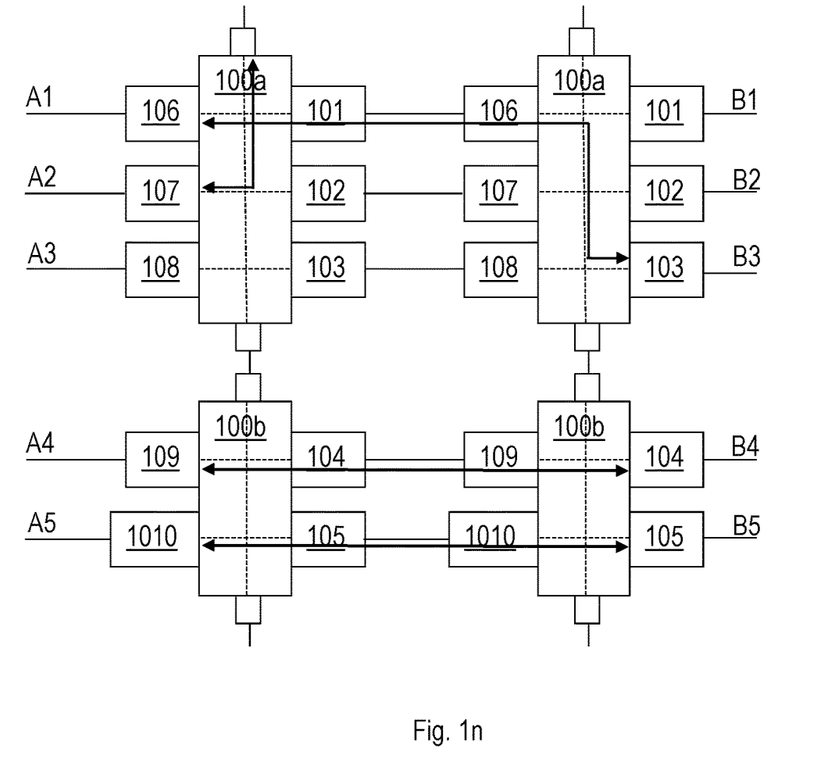

FIGS. 1m and 1n illustrate further extension examples to relieve blocking constrictions for routing toward external entities (e.g. support for multiple rings).

Embodiments herein also relate to an optical communication network 1000 configured according to the architecture described above. The optical communication network 1000 comprises at least a first ODN 120, an MD-WSS 100 having a plurality of ports 101, 105, and at least a first node 110, wherein the first ODN 120 is connected to one of the ports 105 of the MD-WSS 100 and the first node 110 is connected to another one of the ports 101 of the MD-WSS 100, wherein the ports 101, 105 of the MD-WSS 100 are paired such that the port 105 connected to the first ODN 120 is paired with the port 101 connected to the first node 110 such that signals originating at the first ODN 120 are in the normal case routed to the first node 110, and signals originating at the first node 110 are in the normal case routed to the first ODN 120.

The communication network may comprise one or more MD-WSSs having a plurality of ports. The MD-WSS(s) is/are inserted in a feeder fibre section between one or more nodes and one or more ODNs, wherein the respective node(s) and the respective ODN(s) are connected to ports of the MD-WSS(s) as described above. Further, ports of the MD-WSS are paired such that the port connected to the first ODN is paired with the port connected to the first node such that signals originating at the first ODN are in the normal case routed to the first node, and signals originating at the first node are in the normal case routed to the first ODN.

The optical communication network has the same advantages as the network architecture since the network is built, designed, or configured according to the architecture described above.

Embodiments herein also relate to use of an MD-WSS 100 having a plurality of ports 101, 105 in an optical communication network 1000. The MD-WSS 100 is used for interconnecting at least a first node 110 and a first ODN 120 by connecting the at least the first node 110 to one port 101, and the at least first ODN 120 to another port 105, wherein the ports of the MD-WSS are paired such that the port 105 connected to the first ODN 120 is paired with the port 101 connected to the first node 110 such that signals originating at the first ODN 120 are in a default case routed to the first node 110, and signals originating at the first node 110 are in the normal case routed to the first ODN 120.

By using MD-WSS(s) as described above, network may be constructed or designed such that flexible multi-operator sharing on wavelength level may be obtained since the MD-WSS(s) introduces low cost wavelength flexibility in the access infrastructure allowing for multi-actor sharing of the fibre infrastructure. The MD-WSS(s) may also provide flexible multi-service support on wavelength level since the architecture enables flexible multi-service (e.g. packet and Common Public Radio Interface, CPRI) support over the same fibre infrastructure. Still further, MD-WSS(s) may also provide flexible resource/energy optimisation since the flexibility introduced by the architecture enables increased opportunities for resource optimisation depending on traffic load by re-routing traffic and e.g. powering off ports/cards that are not used for saving energy. Yet further, migration and/or upgrade may be simplified since the flexibility introduced by the architecture facilitates migration/upgrade where critical services may temporarily be re-routed to alternative ports during migration/upgrade process. Further the MD-WSS(s) may enable the resiliency to be increased since the flexibility introduced by the architecture provides improved resiliency where critical services may temporarily be re-routed to alternative ports during a node failure.

A regular WSS comprises a series of reflective elements (one per wavelength) which can individually be reconfigured to route wavelengths between the common port and any given tributary port of the WSS. By configuring the reflective element to route a wavelength between two given ports, may often result in "parasitic" effects where the same wavelength also is routed between one or several additional pairs of ports. This effect is generally unwanted and in a conventional WSS, measures are taken to eliminate this effect. The MD-WSS is in contrast designed to exploit these parasitic wavelengths where the effect is wanted. A conventional WSS may be utilised as an MD-WSS depending on the internal structure and to what extent the parasitic wavelengths exist or not. The MD-WSS comprises a reflective element, and a first tributary port and at least a second tributary port, wherein the optical WSS is adapted to switch an optical signal between the first tributary port and the second tributary port by means of the reflective element. Several enhancements to the conventional WSS can be made to maximise the number of parasitic wavelengths resulting in what we refer to as the ideal MD-WSS schematically illustrated in FIG. 2a. These enhancements may include extending the operational (angular) range of the reflective element and adjusting the distances between the different ports in the internal architecture of the WSS.

For simplicity in this disclosure, it is assumed that the MD-WSS is ideal. However, the network architecture and the optical communication network could also be realised with a non-ideal MD-WSS which exploits only a subset of the parasitic wavelengths available in the ideal MD-WSS. The intensity of the parasitic effect decides possible connections and the number of simultaneous connections through the MD-WSS and this is why in the non-ideal embodiments only a subset of the parasitic wavelengths is exploited.

Figure 2A:
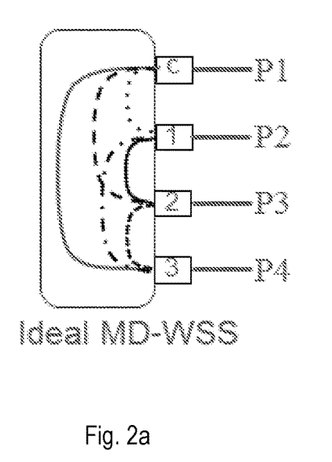
FIG. 2a is an illustration of an ideal 4-port MD-WSS permitting wavelength routing between any port pairs.
Figure 2B:
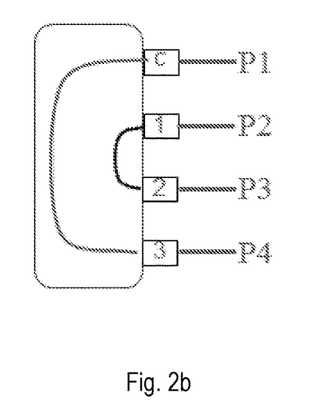

Given the internal structure of the MD-WSS, there is one particular configuration of the reflective element that is particularly interesting, which results in an internal routing or switching between ports, which is illustrated in FIG. 2b, and that is exploited in the MD-WSS of this disclosure. This is the configuration where the wavelength (associated with the reflective element) is routed between defined port-pairs of the MD-WSS.

Figure 2C:
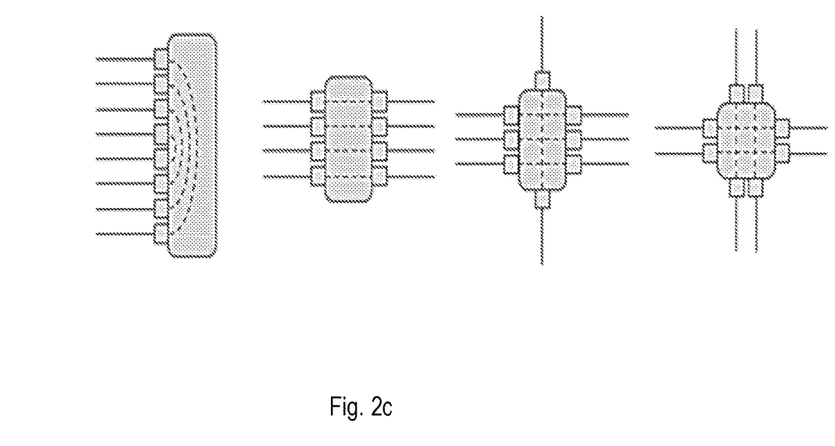
FIG. 2c is an illustration of different graphical representations of an 8-port MD-WSS.

For a particular wavelength, this routing configuration allows for a maximum number of beams to traverse the MD-WSS simultaneously. We use this particular configuration of the reflective element as a definition of the MD-WSS port pairs. For the case of an odd number of ports, one port is paired with itself, i.e. for the considered configuration of the MD-WSS, the wavelength is routed back to the incoming port. For the remainder of this disclosure a graphical representation of the MD-WSS is defined. FIG. 2c illustrates different representations of an 8-port MD-WSS. The pairwise association between ports is also illustrated by dashed lines in FIG. 2c.

Figure 2D:
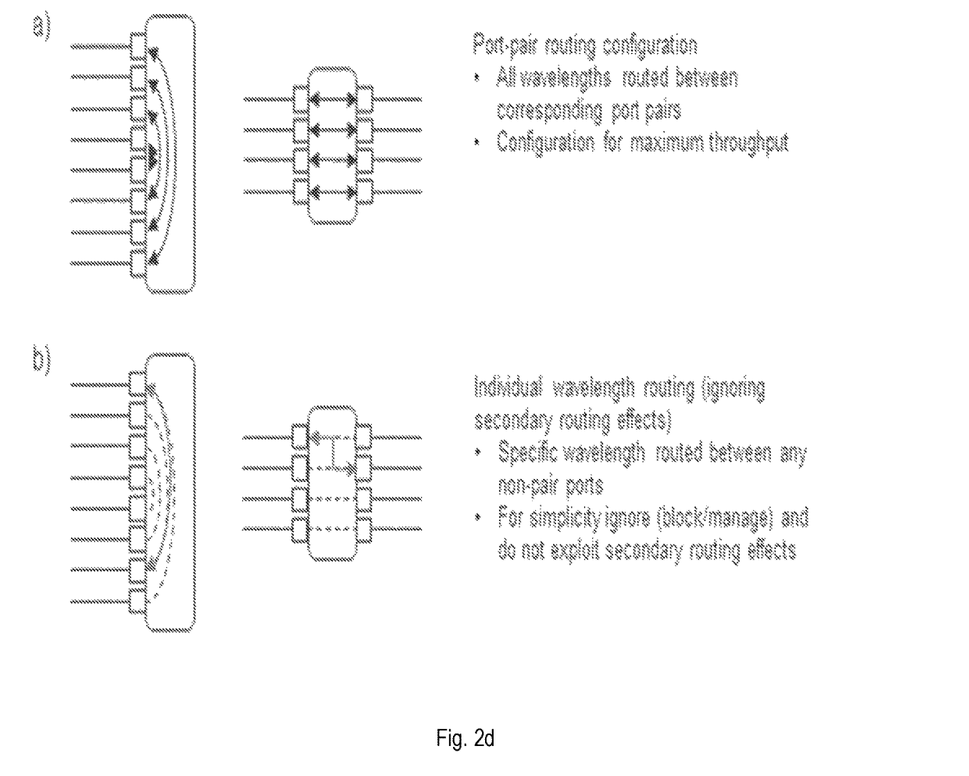
FIG. 2d is an illustration of two types of routing configurations for a given wavelength considered in the invention. a) The port-pair configuration is the configuration where a given wavelength is routed between all pre-defined port-pairs. b) For an ideal MD-WSS a wavelength may also be individually routed between any two ports.

FIG. 2d part (a) on top of the figure, again illustrates the particular routing configuration that is of interest for this disclosure within the new graphical representation. The particular MD-WSS routing configuration where a wavelength is routed between the MD-WSS port pairs will here be referred to as the "port-pair routing configuration".

Besides the port-pair routing configuration illustrated in FIG. 2d part (a) on top of the figure, for an ideal MD-WSS, wavelengths may also be individually routed between any two ports as illustrated in part (b) in the bottom part of FIG. 2d. As already discussed, depending on which two ports, there may be secondary (parasitic) wavelength routing effects. These may be maximally exploited in the "port-pair routing configuration", but for individual routing of wavelengths between two other "non-pair"-ports it is assumed (for the sake of simplicity) that these effects are suppressed (i.e. blocked or otherwise managed by a control system). They could also be exploited but this introduces complexity that is beyond the scope of this invention. Wavelength routing in the MD-WSS is performed on a per wavelength basis. Hence, the MD-WSS may be configured to route a particular wavelength according to the port-pair routing configuration (default routing), while other wavelengths may be routed between individual "non-pair" ports (non-default routing).

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A network architecture for an optical communication network comprising:
   a plurality of Optical Distribution Networks (ODNs), including a first ODN;
   a plurality of nodes, including a first node; and
   a Multi Directional Wavelength Selective Switch (MD-WSS) having a plurality of ports, in which the plurality of ODNs are connected to respective downlink ports of the MD-WSS downlink from the MD-WSS, and in which the plurality of nodes are connected to respective uplink ports of the MD-WSS uplink from the MD-WSS, the plurality of nodes for providing services, operations, or both services and operations, for the ODNs, wherein the MD-WSS further comprises two additional ports that are connected to a ring comprising a part of the optical communication network,
   wherein the first ODN is connected to a first downlink port of the MD-WSS and the first node is connected to a first uplink port of the MD-WSS, wherein respective uplink and downlink ports of the MD-WSS are paired as a default connection, such that the first downlink port connected to the first ODN is paired with the first uplink port connected to the first node in a default configuration, such that signals originating from the first ODN are in a default case routed to the first node, and signals originating from the first node are in the default case routed to the first ODN, and signals originating from the first ODN are routed from the first uplink port to one of the two additional ports, via the MD-WSS, to connect to the ring in a non-default case.

2. A network architecture according to claim 1, further comprising a second ODN connected to a second downlink port of the MD-WSS, which second downlink port is paired to another uplink port of the MD-WSS that is either also connected to the first node or that is connected to a second node.

3. A network architecture according to claim 2, wherein the second ODN, in the default case, is routed by the MD-WSS to the first node and, in the non-default case, is routed by the MD-WSS to the second node.

4. A network architecture according to claim 1, wherein the part of the optical network, including the ring, comprises one or more of another MD-WSS, a Base Band Unit (BBU), a Remote Radio Head (RRH), a WSS, an optical gateway, a Reconfigurable Optical Add Drop Multiplexer (ROADM), an Optical Cross Connector (OXC), and an optical to electrical converter.

5. A network architecture according to claim 1, wherein signals originating from the first node, in a non-default case, are routed by the MD-WSS to one of the two additional ports connected to the ring comprising the part of the optical communication network.

6. A network architecture according to claim 1, comprising at least two MD-WSSs, wherein the at least two MD-WSSs are operating independently of each other to perform connectivity of ODNs and nodes via downlink and uplink ports.

7. A network architecture according to claim 1, comprising at least two MD-WSSs, wherein a port of a first MD-WSS is connected to a port of a second MD-WSS to interconnect the first MD-WSS and the second MD-WSS to operate as the MD-WSS.

8. An optical communication network comprising:
   a plurality of Optical Distribution Networks (ODNs), including a first ODN;
   a plurality of nodes, including a first node; and
   a Multi Directional Wavelength Selective Switch (MD-WSS) having a plurality of ports, in which the plurality of ODNs are connected to respective downlink ports of the MD-WSS downlink from the MD-WSS, and in which the plurality of nodes are connected to respective uplink ports of the MD-WSS uplink from the MD-WSS, the plurality of nodes for providing services, operations, or both services and operations, for the ODNs, wherein the MD-WSS further comprises two additional ports that are connected to a ring comprising a part of the optical communication network,
   wherein the first ODN is connected to a first downlink port of the MD-WSS and the first node is connected to a first uplink port of the MD-WSS, wherein respective uplink and downlink ports of the MD-WSS are paired as a default connection, such that the first downlink port connected to the first ODN is paired with the first uplink port connected to the first node in a default configuration, such that signals originating at the first ODN are in a normal case routed to the first node, and signals originating at the first node are in the normal case routed to the first ODN, and signals originating from the first ODN are routed from the first uplink port to one of the two additional ports, via the MD-WSS, to connect to the ring in a non-default case.

9. A method in a network for a Multi Directional Wavelength Selective Switch (MD-WSS) having a plurality of ports for interconnecting a plurality of nodes and a plurality of Optical Distribution Networks (ODNs), wherein the plurality of nodes, via respective uplink ports of the MD-WSS, and the plurality of ODNs, via respective downlink ports of the MD-WSS, are respectively paired in default configurations via the MD-WSS, and wherein the plurality of nodes are for providing services, operations, or both services and operations, for the plurality of ODNs, and wherein the MD-WSS further comprises two additional ports that are connected to a ring comprising a part of an optical communication network, the method comprising:
   connecting a first node of the plurality of nodes to a first uplink port of the MD-WSS; and
   connecting a first ODN of the plurality of ODNs to a first downlink port of the MD-WSS, wherein respective uplink and downlink ports of the MD-WSS are paired as a default connection, such that the first downlink port connected to the first ODN is paired with the first uplink port connected to the first node in a default configuration, such that signals originating at the first ODN are in a default case routed to the first node, and signals originating at the first node are in the default case routed to the first ODN, and signals originating from the first ODN are routed from the first uplink port to one of the two additional ports, via the MD-WSS, to connect to the ring in a non-default case.

* * * * *